United States Patent
Iwanaga

(10) Patent No.: US 7,414,955 B2
(45) Date of Patent: Aug. 19, 2008

(54) OPTICAL DISC AND RECORDING/PRODUCING METHOD THEREFOR

(75) Inventor: Toshiaki Iwanaga, Tokyo (JP)

(73) Assignee: NEC Corporation, Tokyo (JP)

( * ) Notice: Subject to any disclaimer, the term of this patent is extended or adjusted under 35 U.S.C. 154(b) by 817 days.

(21) Appl. No.: 11/011,023

(22) Filed: Nov. 29, 2004

(65) Prior Publication Data

US 2005/0099935 A1 May 12, 2005

Related U.S. Application Data

(63) Continuation of application No. PCT/JP03/06643, filed on May 28, 2003.

(30) Foreign Application Priority Data

May 29, 2002 (JP) ............................ 2002-156328

(51) Int. Cl.
G11B 7/24 (2006.01)
(52) U.S. Cl. ................... 369/275.3; 369/53.2
(58) Field of Classification Search ........................ None
See application file for complete search history.

(56) References Cited

U.S. PATENT DOCUMENTS 6,345,023 B1 2/2002 Fushimi et al.

FOREIGN PATENT DOCUMENTS

| JP | 9-270131 | 10/1997 |
| JP | 2000-3555 | 1/2000 |
| JP | 2000-36130 | 2/2000 |
| JP | 2001-297446 | 10/2001 |

OTHER PUBLICATIONS

International Search Report dated Jul. 15, 2003.
International Preliminary Examination Report dated Oct. 1, 2003.

*Primary Examiner*—Paul Huber
(74) *Attorney, Agent, or Firm*—Katten Muchin Rosenman LLP

(57) ABSTRACT

An optical disc including one or more than one recording layers has land areas (131) and groove areas (132) as recording tracks, wherein a data recording area of at least one of the recording layers is divided into a plurality of zones in a radial direction. In each of the divided zones, one or more than one prepits (133) with predetermined data are disposed in a track so that each header area is disposed at ever other boundary among the boundaries between the land areas and the groove areas. Each header area is shifted in the circumferential direction from other header areas apart from the each header area by two boundaries without overlapping in the radial direction.

13 Claims, 9 Drawing Sheets

OPTICAL DISC AND RECORDING/PRODUCING METHOD THEREFOR

CROSS-REFERENCE TO RELATED APPLICATION

The present application is a continuation of International Application No. PCT/JP2003/006643, which was filed on May 28, 2003, which is herein incorporated by reference 1. Technical Field The present invention relates to formatting of an optical disc. More particularly, the present invention relates to an optical disc capable of employing a disc formatting scheme suitable for multi-layer discs and to a recording/reproducing method therefor.

2. Background Art

To reproduce signals from any optical disc used at present, a technique is used wherein a laser beam reflected from the optical disk while being modulated thereby is used to detect reproduced signals. From a read-only optical disc, for example, signals are reproduced by detecting the changes in intensity of the laser beam reflected from the pits configuring concavity and convexity on the disc. From a write-once optical disc, signals are reproduced by detecting the changes in the intensity of the laser beam reflected from the disc, the changes resulting from the small pits or the phase changes caused by applying a high-intensity beam to the disc. From a magneto-optical disc, i.e., one type of the rewritable optical discs, the magnetized state of the recording layer is read out as the changes in the polarization plane of the laser beam reflected from the recording layer of the disc by taking advantage of the magneto-optical effect that the recording layer has. From a phase-change optical disc, i.e., another type of the rewritable discs, signals are reproduced by taking advantage of the changes in the intensity of reflected light, which have resulted from the phase changes in the recording layer, similarly to the recordable optical disc.

Among the various types of optical discs described above, a large-capacity rewritable optical disc known as "land/groove recording type" has been developed and put to practical use. This rewritable optical disc has grooves, i.e., guide grooves, and also lands, each arranged between any two adjacent grooves and used as a recording track. The lands are also called "projections" or "inter-groove parts." The grooves are also called "recesses" or "groove parts."

A 4.7-GB DVD-RAM of the land/groove recording type is formatted in a specific manner, wherein each track is divided into a plurality of 2-KB sectors, each sector has prepits, or concavity and convexity pits, in its head part, and the track address and sector address (i.e., the address of the sector), sync signals, and the like are recorded in the prepits.

Each 2-KB sector has a configuration, in which 2 KB (2048 bits) of user data is allocated to each sector. More precisely, although user data is a 2 KB (2048B) data, each sector can store more than 2048 bits, because it stores data ID, ECC parity and the like, in addition to the user data. 2 KB is a minimum unit of data for a file format such as UDF (Universal Disc Format), wherein the sectors have the size adapted to data matching, which is considered to be important.

The land/groove type disc has another feature, i.e., a configuration that should be called "single spiral." In this configuration, land areas and groove areas are alternately arranged and form a circular track. The land/groove type disc has so-called "sector-aligned configuration," which does not a characterizing feature of the disc. Namely, the disc has header areas that are aligned in the radial direction. In the DVD-RAM, each zone has sectors each including a header area, and the sectors are aligned in the radial direction in the each zone. In addition, the tracking grooves (i.e., groove areas) are wobbling, or meandering at low frequency. The wobbles are aligned in the radial direction.

FIG. 5 shows an example of a pre-format arrangement, or an ordinary area that is not a boundary between a land area and a groove area. In other words, the ordinary area is not an area where a land area is switched to a groove area, or vice versa. Any area where a land area is switched to a groove area, or vice versa, is called "switching area." One switching area exits in each circle of a given radius, because the land areas and groove areas form a spiral. For simplicity of description, no wobbles are illustrated in FIG. 5.

As FIG. 5 depicts, header areas 1a and 2a, each consisting of prepits, are provided. Each header area lies at the boundary (indicated by a one-dot, dashed line in the figure) between a land area and a groove area adjacent to the land area. The header areas 1a and the header areas 2a are alternately arranged in the radial direction of the disc. Each header area is of an offset header type wherein the each header is set off by a quarter of Tp (rack pitch) with respect to the following land or groove area, i.e., the following recording track. To reproduce data from the disc, a beam traces a track, reading the address of the track from the header areas 1 and 2. A part of each header area is shared by a groove area and an adjacent land area.

FIG. 6 is a block diagram illustrating a configuration of an optical disc drive that uses the optical disc described above. As shown in FIG. 6, a semiconductor laser 106 emits a beam to a collimate lens 105, which converts the beam to a parallel beam. The parallel beam passes through a half mirror 103 and reaches an objective lens 104, which focuses the beam on the optical disc 100. The optical disc 100 reflects the beam, which passes through the objective lens 104 to the half mirror 103. The half mirror 103 reflects the beam, which is incident onto a photodetector 108. The photodetector 108 is divided into two segments, which are arranged in a direction parallel to the tracks of the optical disc 100, for detecting a tracking error. An actuator 102 supports the objective lens 104, to control the focus thereof. The semiconductor laser 106, collimate lens 105, half mirror 103, objective lens 104 and actuator 102, which lie in the broken-line frame in FIG. 6, constitute an optical head 101 secured to a head base.

The photodetector 108 generates detection signals, which are supplied to a differential amplifier 110. The differential amplifier 110 generates a tracking-error signal from the detection signals. The tracking-error signal is supplied to a polarity-converting unit 117, which converts the polarity of the tracking-error signal, in accordance with a control signal IA supplied from a system control unit 118, which will be described later. The tracking-error signal, thus converted in polarity, is output to a tracking control unit 116. It is assumed here that the tracking control is performed by applying the laser beam onto a recording track defined by a groove when the tracking-error signal is input from the differential amplifier 110 to the tracking control unit 116, with its polarity unchanged.

The tracking control unit 116 receives the output signal of the polarity-converting unit 117 and a control signal L1 of the system control unit 118, which will be described later, to output a tracking control signal to a drive unit 122 and a traverse control unit 121.

A summing amplifier 109 receives the detection signals output from the photodetector 108 and outputs a sum signal. A wave-shaping unit 112 receives a high-frequency component from the summing amplifier 109 and outputs a digital signal to a reproduced-signal processing unit 113 and an address-reproducing unit 114, which will be described later. The reproduced-signal processing unit 113 outputs reproduced data to the output terminal. The address-reproducing unit 114 receives the digital signal from the wave-shaping unit 112 and outputs an address signal to an address-calculating unit 115, which will be described later. The address-calculating unit 115 receives the address signal from the address-reproducing unit 114 and the control signal L4 from the system control unit 118. The unit 115 outputs the address signal to the system control unit 118.

The system for detecting offset headers can be either of two types including a broadband, push-pull detection system that detects difference signals similar to track-error signals, and another detection system that detects sum signals similar to reproduced recording marks. In view of the quality of reproduced signals from the header area and the similarity between sum signals and the reproduced recorded marks, it is recommended that sum signals should be detected. In FIG. 6, the system for detecting wobble signals from the broadband, push-pull detecting system, the clock-signal extracting circuit, and the like are not illustrated for simplicity of description.

The traverse control unit 121 outputs a drive current to a transverse motor 107 when it is controlled by a control signal supplied from the system control unit 118. The transverse motor 107 moves the optical head 101 in the radial direction of the optical disc 100. A record-signal processing unit 119 receives data to be recorded and outputs signals to be recorded, to a laser (LD) drive unit 120. The LD drive unit 120 receives a control signal from the system control unit 118 and receives the signals to be recorded from the record-signal processing unit 119, to deliver a drive current to the semiconductor laser 106. The drive unit 122 outputs the drive current to the actuator 102. The system control unit 118 outputs control signals L1 and L4 to the tracking control unit 116 and to the traverse control unit 121, address-calculating unit 115, polarity-converting unit 117, record-signal processing unit 119 and LD drive unit 120. The system control unit 118 receives an address signal from the address-calculating unit 115.

FIG. 7 depicts the surface format of the recording surface of the optical disc medium described in Japanese Patent Publication No. 2663817. In FIG. 7, G denotes groove areas, L indicates land areas, Tp represents the track pitch, M denotes prepits, and B designates a beam spot. The areas called "ID-signal areas" in the publication will be referred to as "header areas" in this specification. In this disc format, each header area holding address data is shared by a groove area and an adjacent land area. The prepits that represent at least some of the data signals recorded in the header area are set off from the centerline of the groove and the centerline of the land. Further, at least in some of the areas of the optical disc, the header areas and the data-recording areas are arranged in the radial direction of the disc.

The format of the optical disc medium, described above, can be regarded basically to include only the header areas 2a of the DVD-RAM format shown in FIG. 5. That is, it can be said to be a simpler format that consists of header areas. Hence, the invention described in the above-identified publication is directed to a sector-aligned format, just like the DVD-RAM.

In recent years, so-called multilayer optical discs, each having a number of recording layers, have been developed. Of these multi-layer optical discs, read-only optical discs, i.e., DVD-ROMs, each having two recording layers, have already been put to practical use and highly evaluated. However, it is difficult to design a multi-layer recordable optical disc even if the disc has only two recording layers. Thus, the multi-layer recordable optical disc still remains in the stage of research.

FIG. 8 shows a sectional view of a two-layer optical disc and illustrates the positional relation between an optical head and a beam. This optical disc will be described hereinafter while denoting a recording layer lying near the optical bead, or near that surface of the disc onto which a beam is incident, at numeral 1, and a recording layer 2 lying in a deep region of the disc at numeral 2.

The two-layer optical disc includes an optical disc substrate 1b, a recording layer 10 positioned near the beam-receiving surface, and a recording layer 20 on which the beam passing through the recording layer 10 is focused. The recording layer 10 must be designed to acquire a desirable recording-reproducing property, by reducing the difference in transmittance between any recorded mark and any unrecorded parts. If this difference in the transmittance cannot be reduced in the recording layer 10, the beam reaching the recording layer 20 after passing through the recording layer 10 cannot have a uniform intensity and cannot serve to recording data in the disc correctly. As to the reproducing performance, if the transmittance of each recorded mark extremely differs from that of each unrecorded part, the recorded mark will be reproduced at a small SNR, thereby increasing errors in data reproduction. The recording layer must therefore be adjusted in composition and layer configuration to impart a uniform transmittance to the recorded marks and unrecorded parts. Reportedly, some uniform transmittance has been successful achieved between recorded marks and unrecorded parts.

There are various problems that should be solved to provide a multi-layer optical disc that has address data. Consider a two-layer optical disc having such address data. When a beam is focused on the recording layer 20 to record or reproduce data in and from the recording layer 20, the header areas of the prepits formed in the recording layer 10 are equivalent to that disc defects exist on the recording layer 10, from the viewpoint of recording or reproducing data in and from the recording layer 20. As specified above, the data area and the header area differ in terms of reflectance and transmittance. Hence, so-called inter-layer crosstalk will develop when a light-receiving element detects a light beam passing through the recording layer 10 if any header area lies within the diameter of the light beam.

Although the data area and the header area differ a little in terms of transmittance, more prominent than this difference is the difference in reflectance between the data area and the header area. The difference in the amount of reflected light depends upon the relation between the diameter of the beam and the length of the header area. As reported in symposiums, it is required that the recording layers 10 and 20 be spaced apart from one another by a distance of about 30 μm in order to minimize optical aberration and focusing interference.

The optical disc disclosed in Japanese Patent Publication No. 2663817 has a sector-aligned format and has prepit-headers simpler than those of a DVD-RAM. A beam may be focused on the recording layer 20 of such an optical disc, thereby to record or reproduce data in or from the disc. In this case, part of the beam that has passed through the recording layer 10 is reflected at header areas that are aligned on the layer 10 in the radial direction of the disc, as is illustrated in FIG. 9A In FIG. 9A, the shape of the beam spot is schematically indicated as reduced in the radial direction of the disc. This is because the ratio of the track pitch to the diameter of the beam spot cannot be represented in the actual value.

Assume that the distance between the recording layers is 30 μm, the substrate has refractive index of 1.6, and the objective lens has a numerical aperture (NA) of 0.85. Then, the beam spot formed on the recording layer 10 has a diameter of about 44 μm in terms of geometrical optics. About 79 tracks are irradiated by one beam spot having this diameter of 44 μm, if the track pitch is 0.56 μm (0.28 μmL/G) If the disc is a land/groove recording type one, twice as many data tracks, i.e., about 158 tracks, are irradiated by one beam spot. If the bit density is 0.12 μs M/bit, data of 1B (byte) is recorded by (1, 7) RLL scheme, in an area that extends about 1.44 μm in the radial direction. Then, data of about 31B falls within a beam spot having a diameter of about 44 μm. AB will be described later, the region storing data of about 31B has a length almost the me as the length of a header area.

Assume that the beam spot moves, tog positions 1, 2, 3, 4 and 5 on the recording layer 10, as illustrated in FIG. 9A. At positions 1 and 5, the beam spot irradiates no header areas; at position 2, the right half of the beam spot irradiates some header areas; at position 3, the beam spot irradiates sector-aligned header areas; and at position 4, the left half of the beam spot irradiates some header areas. As FIG. 9B shows, the intensity of the beam reflected from the recording layer 10 depends on which position the beam takes on the recording layer 10. The beam has the highest intensity when takes position 3.

If the light beam is focused on the recording layer 20 after passing through the recording layer 10, the photodetector of the optical head detects the beam reflected by the recording layer 10, as well as the beam reflected from a recorded mark provided on the recording layer 20. That is, the photodetector detects these beams that are superposed one on the other. If the beam reflected from the header areas of the recording layer 10 is more intense than the beam reflected from the recording layer 20 (i.e., reproduced signal), a so-called inter-layer crosstalk, which is an undesirable phenomenon, will occur.

The inter-layer crosstalk may be defined as a difference in frequency between carrier waves, just like ordinary reproduction crosstalks. Instead, it can be defined as follows, in terms of the intensity change that the reflected beam undergoes as shown in FIG. 9B:

$$100 \cdot (C-D)/(C+D)[\%] \quad (1)$$

This change in the intensity of the beam results from a change that occurs in an area of the recording layer 10, from which the beam is reflected and which is larger than the smallest area that can be identified at the optical resolution equivalent to the beam-spot diameter. The change in a small beam-reflecting area such as a recorded mark is represented by an average change in the intensity of the reflected beam. Therefore, this is rather a level change, not a change in a signal. This change is an offset and may influence signals reproduced from the disc. Nonetheless, this change can be processed, merely as a noise increase in the signal to be detected, unless it is prominent.

Any change in the intensity of the reflected beam, which results from then existence of header areas, is observed as such a prominent change as is depicted in FIG. 9B. Hence, no data can be read from the recording layer 20 if the light beam reflected from the recording layer 10 is intense enough to alter the amplitude of the signal read from the recording layer 20 on which the beam is focused. Thus, the recording layer 20 cannot be used in practice.

The 1-7 modulation scheme may be employed to recording data. If this is the case, any mark to be recorded may have one of seven lengths, ranging from 2T to 8T (T is the period of the channel-clock signal). The marks may be spaced apart, by one of seven spaces. Marks and spaces are alternately recorded.

The marks and spaces vary not only in time length, but also in physical length. The shortest mark (2T) is four times as short as the longest mark (8T). Assume that the longest mark is 0.5 μm long and that the focused beam has a diameter of 0.4 μm. Then, any signal read from a mark (8T, 7T) larger than the beam spot and normalized to 1 has maximum amplitude of 1. In contrast, any signal read from a mark smaller than the beam spot (i.e., mark having a length 2T to 6T) has maximum amplitude of 1 or less. A mark having length 2T has the smallest maximum amplitude.

The recording layer 10 has header areas. The bean reflected from the recording layer 10 changes in intensity because the beam irradiates the header areas. This change in intensity is prominent, particularly when the amplitude ratio between the signal read from a short mark and the signal read from the long mark decreases to 10% or less, due to the inter-symbol interference. In this case, the data reproduced cannot be identified if the change in intensity of the beam reflected from the layer 10 is as much as, or more greatly than, the amplitude of the small signal read from the shortest mark. Consequently, the clock signal may not be extracted or the bit error rate may be greatly increased.

Thus, in order to increase the recording density of a multi-layer optical disc or decrease the error rate in recording and reproducing data in and from the optical disc, it is necessary to reduce the intensity of the light beam reflected from the recording layer provided near the surface that receives the light beam.

DISCLOSURE OF THE INVENTION

The present invention has been devised in view of the foregoing. An object of the invention is to provide an optical disc having a simple configuration and a large storage capacity by allowing a disc format that can be applied to optical discs of land/groove recording type, each having a plurality of recording layers.

For achieving the above object, the present invention provides an optical disc including at least one recording layer having land areas and groove areas to be used as recording tracks, wherein a data-recording area of at least one of the at least one recording layer is divided into a plurality of zones in a radial direction; each of the plurality of divided zones includes a plurality of header areas each including prepits that hold predetermined data, the header area being arranged at every other boundary among boundaries between the land areas and the groove areas so that at least one header area is provided in each recording track; and each header area is shifted in a circumferential direction from another header area that is spaced from the each header area by a distance corresponding to at least two boundaries, and is not aligned in the radial direction with the another header area.

In an optical disc according to the present invention, the header areas of the recording layer located near the light-incident side are not aligned in the radial direction of the disc. Therefore, the quality degradation of signals reproduced from the disc can be decreased, in spite of the inter-layer crosstalk that develops when a beam is focused on the recording layer that lies remote from the optical head.

To achieve the above-described object of the invention, the recording/reproducing method using the optical disc according to the present invention is such that the user data is not recorded in portions of the land areas or in portions of the data-recording areas of the groove areas, which are located adjacent to the header areas in the radial direction.

In the recording/reproducing method according to the present invention, the user data is not recorded in portions of the land areas adjacent to the header areas in the radial direction or in the data-recording areas of the groove areas. Hence, the crosstalk between the signal light beam from a header area and the signal light beam from a recording-data area can be decreased.

BRIEF DESCRIPTION OF THE DRAWINGS

FIG. 8 is a sectional view schematically showing the positional relation between a two-layer optical disc and a light beam.

BEST MODE FOR CARRYING OUT THE INVENTION

Figure 1:
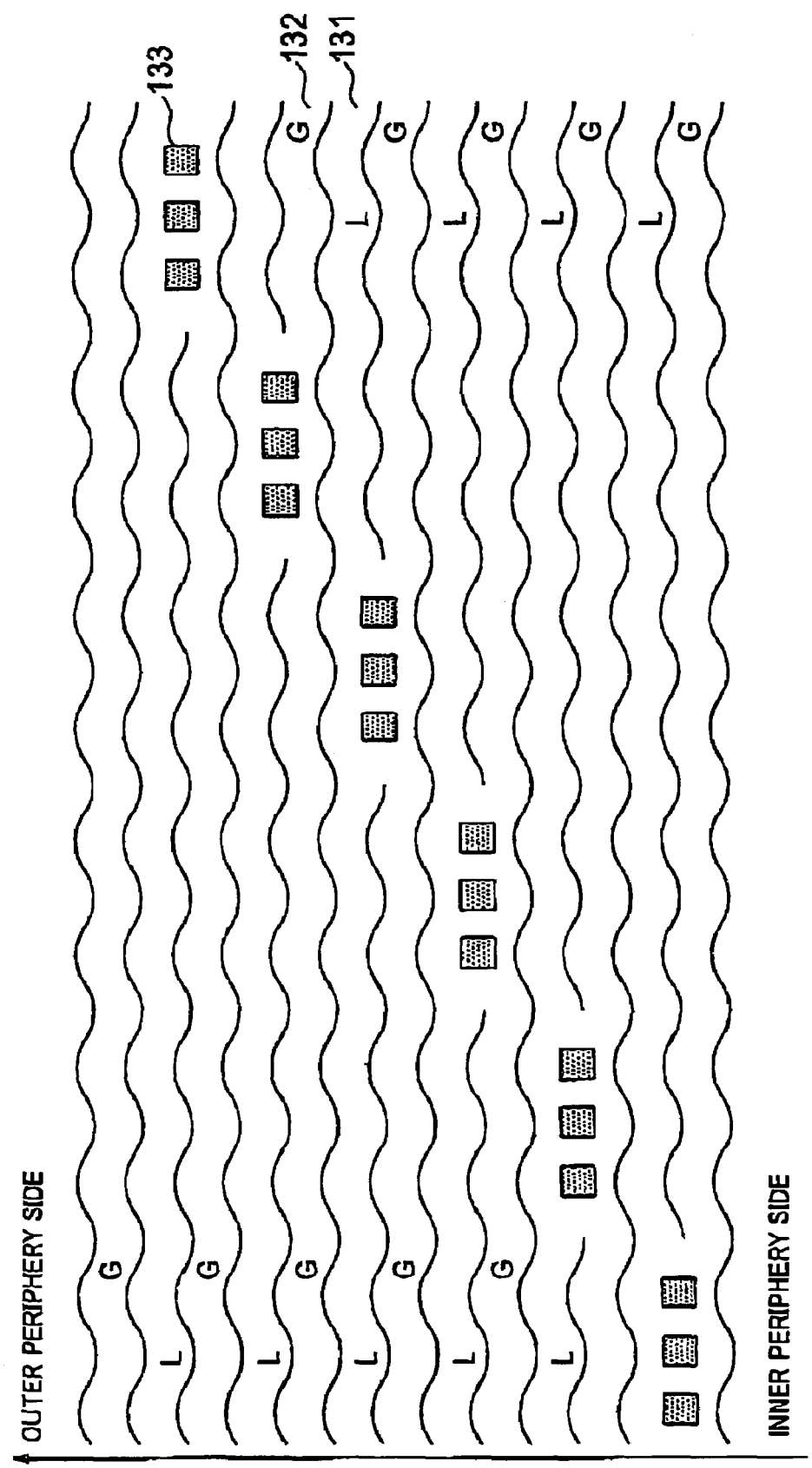
FIG. 1 is a top plan view of an optical disc according to one embodiment of the present invention.

An optical disc drive, which is a preferable embodiment of the present invention, has the following features, for example.

A signal change in an optical signal generated by receiving light reflected from a recording layer that is arranged closer to a light-incident side than a recording layer on which the light beam is focused is at most 10% of a signal amplitude of an optical signal generated by receiving light reflected from a recorded mark/space that includes prepit trains and is provided in the recording layer on which the light beam is focused.

The groove areas wobble at a frequency equal to an integral multiple of a channel-clock frequency and are aligned in each zone in the radial direction.

A circumferential length of the header areas and a circumferential length of a segment divided by the header areas, to form as a unit data-recording areas, are integral multiples of a wobbling period at which the groove areas wobble.

The predetermined data held in the header areas include, in addition to a sync signal, at least one of subordinate data items including address data, recording-layer data, copy-protection data, and error-detection data and error-correction data for the predetermined data.

The header areas and the data-recording areas adopt a common modulation scheme, and the prepits in each header area are recorded at a line density that is an integral divisor of a line density of recorded marks recorded in the recording tracks.

Dummy-data areas in which user data is not recorded are provided in portions of the land areas and the groove areas constituting the data-recording areas, the portions being adjacent to the header areas in the radial direction.

Dummy-data areas in which user data is not recorded are provided in portions of one of the land areas and one of the groove areas constituting the data-recording areas, which are adjacent to the header area in the radial direction, and in portions of another of the land areas and another of the groove areas, which are adjacent in the radial direction to the one of the groove areas and the one of the land areas, respectively, constituting the data-recording areas.

A shortest mark and a shortest space are repeatedly formed in the dummy-data areas.

Control data for controlling an apparatus that records and reproduces data on the optical disc is recorded in the dummy-data areas.

The dummy-data areas are used as areas for adjusting a power of a data-recording beam.

In a preferred embodiment of the method of the present invention, user data is not recorded in portions of one of the land areas and one of the groove areas constituting the data-recording areas, which are adjacent to the header area in the radial direction, and in portions of another of the land areas and another of the groove areas, which are adjacent in the radial direction to the one of the groove areas and the one of the land areas, respectively constituting the data-recording areas.

Now, the present invention will be described in more detail based on the embodiment of the present invention with reference to the accompanying drawings. The embodiment will be described while exemplifying a (1, 7) RLL modulation scheme and a mark-edge recording technique. In the drawings, similar components are designated by like reference numerals.

In this example, the rotation of an optical disc is controlled by an intra-zone CAV (Constant Angular Velocity) system. The embodiment exemplifies a two-layer optical disc of a recordable/reproducible type having two layers each constituting a phase-change (PC) medium wherein actual reflectance is changed to recording data. More specifically, the optical disc used in the embodiment has a recording layer 10 which is provided at the light-incident side, and a recording layer 20 on which the beam is focused after passing through the recording layer 10.

It is assumed here, for example, that the beam spot thus focused has a diameter ($1/e^2$) of 0.4 µm, the track width in the land areas is 0.28 µm, the track width in the groove areas is 0.28 µm, and the distance between the two layers, i.e., so-called inter-layer distance is 30 µm. It is to be noted that the optical disc according to the invention has no specific switching area between any land area and the adjacent groove areas, and thus does not have a seamless structure. Hence, a land area is switched to a groove area, or vice versa, at any given position, by means of track jumping or the like. This switching may be started at a data position, such as a segment unit or a sector unit.

First Embodiment

FIG. 1 shows the surface configuration of the recording layer 10, which is one of the two recording layers of an optical disc according to this embodiment, and lies near the light source of an optical head. The wobbles shown in FIG. 1. i.e., meandering lines, are schematic ones. The number of the wobbles is not equal to the number of waves, which will be described later.

As FIG. 1 depicts, the header areas are arranged between the data-recording areas and equally spaced from one another in the scanning direction of the light beam in the data-recording areas, that is, in the circumferential direction of the optical disc. The data-recording areas including land areas 131 (i.e., areas L), which are convex portions of the optical disc, and adjacent groove areas 132 (i.e., areas G), which are concave portions. Further, prepit areas are located each on an every other boundary between a land area L and a groove area G. Each prepit area includes prepits 133 that represent physical address data common to the land area and the groove area. The prepits 133 are staggered or shifted from those of the next prepit area, by T/4, where Tp is the track pitch of the land areas 181 or groove areas 182. This configuration is similar to that of the conventional optical d described before, in that the land area 131 on the one side of a boundary and the groove area 132 on the other side of the boundary share the same address in pair. In FIG. 1, the prepits 133 are staggered or shifted by Tp/4 toward the outer circumference from the centerline of a groove. Nonetheless, the prepits 133 may be staggered by a distance slightly shorter than Tp/4. In this case, too, the object of the present invention can be achieved depending on the shape of the prepits.

In the present embodiment, the header areas formed by the prepits 188 each holding address data are shifted by a specific distance, in the circumferential direction. In other words, the header areas are not aligned in the radial direction of the optical disc. This helps to decrease the inter-layer crosstalk in two-layer optical discs Since the header areas of the recording layer 10 are not aligned in the radial direction, at most one header area can lie within the diameter of the beam. The inter-layer crosstalk can be reduced far more greatly than in the case where the header areas are aligned in the radial direction. One header area lies within the diameter of the beam, because a region storing data of about 31B lies within the diameter of the beam, which is about 44 μm as specified above, and also because the beam diameter is almost equal to the length of the header area in the track format shown in FIG. 2.

The header areas of the recording layer 10 thus shifted do not cause reproduction crosstalk between the header areas when data is recorded/reproduced on the recording layer 10, whereby the header data can be reliably reproduced. It is desirable to shift the header areas by the length of the header areas. If the header areas are shifted by a distance shorter than the length thereof, the reproduction crosstalk between the header areas will be prominent when the beam is focused on the recording layer 10 to recording data in, or reproduce data from, the recording layer 10. In this event, it is difficult to read the address data. If the header areas are shifted by a distance much longer than the length thereof, the track-format efficiency will greatly decrease, rendering it necessary to perform a complex process on the data to be recorded in the format control.

In the optical disc according to the first embodiment, the header areas of the recording layer 10 that lies near the light-incident side are not aligned in the radial direction. This helps to reduce the influence of the inter-layer crosstalk when the light is applied to the recording layer 20 after passing the recording layer 10, thereby recording/reproducing data on the recording layer 20. In addition, data can be reliably read from the header areas of the recording layer 10. This is because the influence of the reproduction crosstalk can be reduced when data is reproduced from the recording layer 10.

Second Embodiment

In an optical disc according to this embodiment, the change of the Hal generated from the light reflected by the recording layer near the light-incident side is at most 10% of the amplitude of the signal generated from the light reflected by We recorded mark/space which includes trains of prepits and which is provided on the other recording layer on which a light beam is focused.

For example, when a light beam is focused on the recording layer 20 to record or reproduce data, the beam passing the recording layer 10 has a diameter of about 44 μm, as described above. The light beam reflected from the recording layer 10 including the header areas irradiated by the beam spot is superposed on the light beam reflected from the recording layer 20. The light-receiving element incorporated in the optical head receives both light beams, superposed one on the other.

As described before in the problems with the prior art, the data reproduced cannot be correctly identified if the change in intensity of the reflected beam is as much as, or more greatly than, the amplitude of the signal read from the shortest mark. This would greatly impair the extraction of the clock signal and would greatly increase the bit error rate. In other words, data cannot be correctly read from the recording layer 20 if the light-receiving element of the optical head detects a change in intensity of the beam reflected from the header area of the layer 10, which is as much as, or more greatly than, the amplitude of the signal read from the shortest mark provided on the recording layer 20.

This phenomenon is prominent, particularly if the data is recorded in such a high deity in the recording layer 20 that the amplitude ratio between the signals reproduced from a long recorded mark and a short recorded mark is 10% or less due to the inter-symbol interference. If the (1, 7) RLL modulation scheme is employed, the signals reproduced will have 7-value, 9-value, or higher-value levels. Naturally, the level difference between these signals is as small as one-seventh, one-ninth, and so on. If any amplitude change that surpasses this small level difference is superposed, as a disturbance, on a signal reproduced, this results in a signal-detection error. As known in the art, such a signal-detection error is prominent in a method of detecting signal levels, such as a PRML technique.

Once an external disturbance is imposed on any signal reproduced, it changes the envelope of the signal, or the peak amplitude thereof. Generally, any signal read by an optical head is found to be "1" or "0" in accordance whether its voltage is higher than the predetermined threshold value (potential). If the threshold value is fixed, a change in envelope, if any, is equivalent to a change of the threshold value. Consequently, a signal having value "1" may be detected as one having value "0." or a signal having value "0" may be detected as one having value "1."

To prevent erroneous detection of signals, due to the external disturbance, it is therefore required that the light reflected from the recorded mark/space on the recording layer 20 on which the light beam is focused should have intensity that is equivalent to at most 10% of the amplitude of the signal generated from the light received. Hence, the medium must be designed to have a disc format that meets this requirement.

Therefore, in the optical disc according to the present embodiment, the change of the signal generated from the light reflected by the recording layer 10 provided near the light-incident side is at most 10% of the amplitude of the signal generated from the light reflected by the recorded mark/space which is provided on the recording layer 20 and which includes try of prepits. Thus, the data can be correctly read from the recording layer 20.

Third Embodiment

In an optical disc according to this embodiment, the groove areas wobble at a frequency that is an integral multiple of the channel-clock frequency and are aligned, in each zone, in the radial direction of the disc.

As FIG. 1 shows, the groove areas may be formed in each zone by the intra-zone CAM system and may therefore wobble, forming wobbles, at a frequency that is an integral multiple of the channel-clock frequency. In this case, the wobbles will be aligned in the radial direction of the disc. In a two-layer optical disc, for example, the inter-layer crosstalk developing when data is recorded/reproduced on the recording layer 20 causes only a negligibly small interference even if the groove areas wobble on the recording layer 10 at a prescribed frequency.

The wobbles formed are aligned in the radial direction of the disc. As a result, wobble signals that have no distortion like the signals reproduced from the groove areas are detected in the land areas. A desirable recording clock signal can therefore be generated from these wobble signals. The signals reproduced from the marks on the recorded parts of the land areas have resulted from wobbles aligned in the radial direction. Thus, it is possible to reproduce signals that undergo no envelope changes.

If the wobbling period is, for example, 64T (T is the channel-clock period), then the wobbling period may be set at a frequency between the servo-frequency region and the recorded-data frequency region, thereby reducing the interference therebetween.

The servo-frequency band is concerned with the mechanical characteristics of the disc. Generally, this band ranges from 0 KHz to a few KHz, at most 10 KHz. It is desirable not to use a band up to ten times the servo-frequency band (i.e., 100 KHz or less) for any other objective, in order to prevent frequency interference. The frequency band for recording data is several MHz (e.g., 8 MHz, at which 8T marks are repeated at the lowest frequency. It is desirable not to use a band up to one-tenth of the frequency band for recording data (i.e., 800 KHz or less) for any other objective, for a reason similar to the reason for the servo-frequency band. Thus, the frequency band ranging from 100 KHz to 800 KHz can be used for other purposes, such as for the wobbling period. If the wobbling period is 64T (i.e., 780 KHz) as described above, it falls within a desirable range, whereby the signals scarcely interfere with one another.

If the amplitude of wobbling is too large, the signal reproduced from a mark recorded in a data-recording area will undergo envelope change and be degraded in quality. In contrast, if the amplitude of wobbling is too small, a desirable recording clock signal can no longer be generated from the wobble signals. The amplitude of wobbling may be, for example, 10 nmp-p. Then, the CNR of the wobble signals will be 35 dB or more as is desired, and no envelope changes will occur in the signals reproduced from the data-recording areas. Thus, superior data-reproducing characteristics can be attained. It is to be noted that "p-p" in "nmp-p" stands for "peak-to-peak," i.e., inter-peak distance. Therefore, "10 nmp-p" means an inter-peak distance of 10 nm.

As indicated above, the groove areas are wobbling at a frequency that is an integral multiple of the channel-dock frequency in the optical disc according to the third embodiment. Moreover, the groove areas are aligned, in each zone, in the radial direction of the disc. The disc can therefore have an improved characteristic of reproducing wobble signals and mark signals.

Fourth Embodiment

Figure 2:
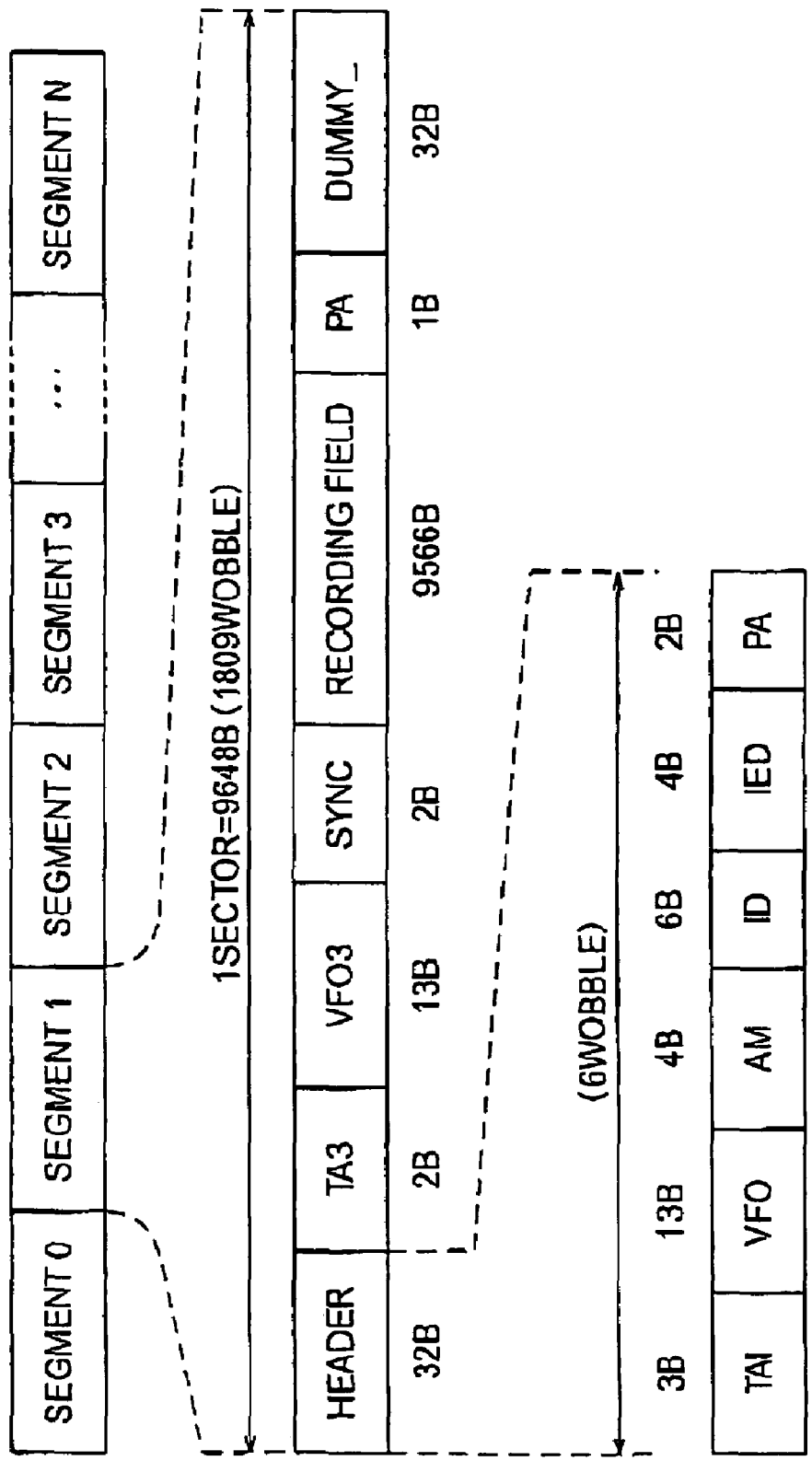
FIG. 2 is a diagram illustrating an example of a principal part of the track format of an optical disc according to the present invention.

FIG. 2 illustrates an example of the track format of an optical disc according to the present embodiment. In FIG. 2, the track format is exemplarily shown corresponding to each of the segments of the groove area. Each segment consists of 8 KB that is an integral multiple of 2 KB, including a total of 9648 B including a data-recording area that contains sync signals, ECCs and the like. The header area is denoted by "HEADER". TA1 and TA3 indicate mirror surfaces in this example.

The term "segment" as used herein means a section of data-recording area, and may be instead referred to as "sector," which is used in the conventional technique. It is to be noted however that the disc format in the present embodiment does not use aligned sectors and has a specific sector capacity that is unknown to the conventional optical-disc standards and may be called "8-KB sector." This is why the term "segment" is used herein.

The ECC blocks consist of 64 KB each. Namely, each ECC block includes eight 8-KB segments. Each segment holds, at the head thereof, information including address data. A disc drive records a data structure including VFO3, SYNC, a recording field and a postamble PA, which is followed by DUMMY In other words, the disc drive records, in addition to the fixed data patterns such as VFO3 and SYNC, user data in modulated codes, as well as additional ECC parity data and RESYNC pattern in the recording field.

The header area has a length which is an integral multiple of the wobbling period, as measured along the circumference of the disc. The wobbling period is set to a frequency value that lies between the servo-frequency region and the recorded-data frequency region so that the signals scarcely interfere with one another. For simplicity of description, the header area does not include TA3. Nonetheless, in general, the disc format is not limited to this definition. In FIG. 2, the wobbling period is 64T (T is the channel-clock period), and the header area is formed of 6 wobbles, or 384T that is an integral multiple of 64T. Each segment is composed of 1809 wobbles.

The disc substrate can be formed so that prepits are formed in the header areas with the wobbling grooves maintained continuous in phase, as illustrated in FIGS. 1 and 2. In other words, it is possible to form the disc substrate itself so that the prepits may wobble in the header areas, at the same cycle as the groove areas wobble.

If the prepits formed in any header area wobble at a wobble period, however, the edges of the prepits may deviate from the prescribed timing positions, depending upon the relation between the wobbling frequent and the line-density of the header areas or upon the relation between the wobbling amplitude and the line-density of the header areas. Consequently, it will be difficult to detect data correctly. In view of this, the prepits formed in the header areas do not wobble in the present embodiment.

Nonetheless, the prepits may wobble to cause no problems if the inter-symbol interference in the reproduced signal from the prepits is such that the line-density of the header areas is so low that the ratio of signals generated from the prepits in an long mark to the those generated from the prepits in any short mark is 50% or more.

As specified above, the optical disc according to the present embodiment is so designed that the length of each header area and the length of each segment, both measured along the circumference of the disc, are integral multiples of the wobbling period of wobbles. This imps phase continuity to the wobbles. Thus, a channel-clock signal of a desired frequency can be generated from a wobble signal with higher accuracy, and can be used as a high-precision recording clock signal, particularly in recording data.

Fifth Embodiment

In the present embodiment, the preset data includes, in addition to sync signals, at least one of sub-data items including address data, recording-layer is data, copy-protection data, and error-detection data and error correction data for the preset data.

In FIG. 2, TA1 denotes a mirror surface. The mirror surface TA1 is unnecessary in the two-bean cutting scheme. When a one-beam cutting apparatus is employed, the mirror surface TA1 must be provided during the transient-response period for achieving an offset in cutting offset header areas.

More specifically, when a one-beam cutting apparatus is used to cut the substrate master, it stops cutting a groove area, then cuts prepits in an offset header, and starts cutting a next groove area. The beam cannot be shifted from a groove area to an offset header, or vice versa, in an infinitesimal time. (The beam cannot be instantaneously shifted.) That is, some time is required to shift the beam. In any optical disc according to this invention, it takes time for 1B to shift the beam between a groove area and an offset header. If data of 2B or above involves, a TA (transient area) must be provided on the disc.

When a two-beam cutting apparatus is used to cut the substrate master, it applies one beam to cut a groove area, while applying the other beam to cut prepits of the offset header. Therefore, no TA needs to be provided on the disc.

TA1 serves in reproducing data for identifying the staring point of each header area.

VFO denotes an area for extracting a PLL clock signal. This area is formed of sine-frequency prepits that are equivalent to 2T signals or 3T signals. VFO is followed by an address mark AM, a segment address ID, and an error-correcting code IED, the address mark AM being used as a sync signal The code IED is used to correct the segment address ID. A postamble PA is data representing the termination of (1, 7) RLL modulation.

In an optical disc according to the present embodiment, recording-layer data is recorded, replacing such address data or in addition thereto. The recording-layer data contains an ID bit identifying the subject recording layer and the data item representing the conditions of recording data in the recording layer. The data item, that represents the data-recording conditions and hitherto recorded in a control-data area of the disc, is recorded in the header area. Thus, the disc need not have special areas such as emboss-pit areas. This data item may be recorded in the header area included in the read-in region, ice, the inner circumferential region of the disc. Then, the header area of the read-in region can serve as a control-data area, as well. The copy-protection data is disc ID data or key data. If this data is too large to be recorded in one header area, the data will be recorded in two or more header areas, which can be used as one data block. The optical disc, which stores such data thus recorded, is a multi-layer optical disc of large storage capacity, high performance and high use-efficiency.

Sixth Embodiment

An optical disc according to the present embodiment is such that the line-density of header areas is an integral divisor of the line-density of a recorded mark recorded in a recording track.

To record the header areas under the condition of the same line-density as the data recorded, prepits can hardly be formed in the header areas. It is assumed here that a single-side, 36-GB disc medium having a diameter of 120 mm, for example, has track-formatting efficiency of 83.9%, track pitch of 0.56 µm (0.28 µmL/G), and a pit depth of about 45 nm, and the (1, 7) RLL modulation scheme is employed. Then, the data-recording areas sill have a line-density of about 92 nm/bit. The 2T-mark length, which is the length of the shortest mark, should be set to about 0.123 µm. As is inferred from the reports made at symposiums, marks having this 2T-mark length cannot be formed at high precision by the conventional cutting apparatus that uses ultraviolet rays, or even by a cutting apparatus that uses deep-ultraviolet rays that have a shorter wavelength. To cut the mark length with higher precision, an electron-beam exposure apparatus should be used. It is practically difficult, however, to use the electron-beam exposure apparatus, due to the high running cost of the apparatus.

When data is recorded in a phase-change medium at high density, marks having a 0.1 µm can be recorded, as has been proved through SEM observation. This is perhaps because the phase-change medium has a recording layer as thin as 15 µm, and undergoes thermal recording substantially without physical deformation, achieving a difference in recording resolution.

In view of the above problems, the header areas must have a lower line-density than the data-recording areas. Since it is desired that data in the header areas and the data areas be reproduced in synchrony with the channel clock frequency, the system should be designed so that the frequency of the header areas is an integral multiple of that of the data-recording areas. More specifically, if the line-density of the header areas is half the line-density of the data-recording areas, the 2T-mark length will be about 0.246 µm (=2×0.123 µm). A cutting apparatus that uses deep-ultraviolet rays can cut marks that have this length 2T The header areas are prepit headers (offset headers) that are set off by Tp/4 with respect to the land areas or groove areas that are data-recording tracks following the header areas. Data is therefore read from each header area when the header area is irradiated with either the left half or right half of the spot of the beam focused on the disc. Hence, signals reproduced from the header areas are inferior in quality to the signals reproduced from the prepits or recorded marks that are irradiated with the center part of the beam spot. This is why the header areas need to have a lower line-density than the data-recording areas.

If inter-symbol interference develops, long marks (such as 8T-, 7T-, 6T-, or 5T-long mark) have their amplitudes reduced a little, whereas short marks (such as 4T- or less-long mark) have their amplitudes greatly reduced. Since a smaller amplitude provides a smaller slope of the waveform (In other words, proximity of the peek of the vibration to the central axis and thus linearity of the waveform.), the signal reproduced is more susceptible to noise, thereby involving a data-detecting error. If the line-density for marks smaller than 5T-marks is reduced to a half, these marks will be twice as long: 5T-marks will become 10T-marks; 4T-marks will become 8T-marks; 3T-marks will become 6T-marks; and 2T-marks will become 4T-marks, whereby these signals can be detected more easily. If the line-density of the header areas only is to be lowered, the storage capacity of the entire disc will scarcely decrease. Thus, it is possible to enhances the accuracy of detecting prepit signals while substantially maintaining the storage capacity of the optical disc.

The case specified above is nothing more than an example. If the line-density of the data-recording areas is low, the line-density of the header areas need not be lowered. In the format of FIG. 2, VFO, the address mark AM, the segment address ID, the error-correcting code IED, and the postamble PA are recorded in half the line-density of the data-recording area. Hence, these data items are represented as twice as many bytes of the others.

As described above, prepits are provided in the header areas in a line-density that is an integral divisor of that of recorded marks recorded in the recording track in the optical disc according to the present embodiment. With this feature, prepits can be formed in each header areas, without the necessity of using a special cutting apparatus. Moreover, the amount of data that can be recorded in the prepit headers can decrease. In this regard, note that any signals reproduced from the prepit headers are inferior in quality because these headers are set off with respect to the tracks. Hence, the time required to correct errors can be decreased.

Seventh Embodiment

This embodiment is concerned with an optical disc and a method of recording/reproducing on the optical disc, wherein no user data is recorded in the data-recording area of any land area or any groove area that is adjacent to a header area.

Figure 3:
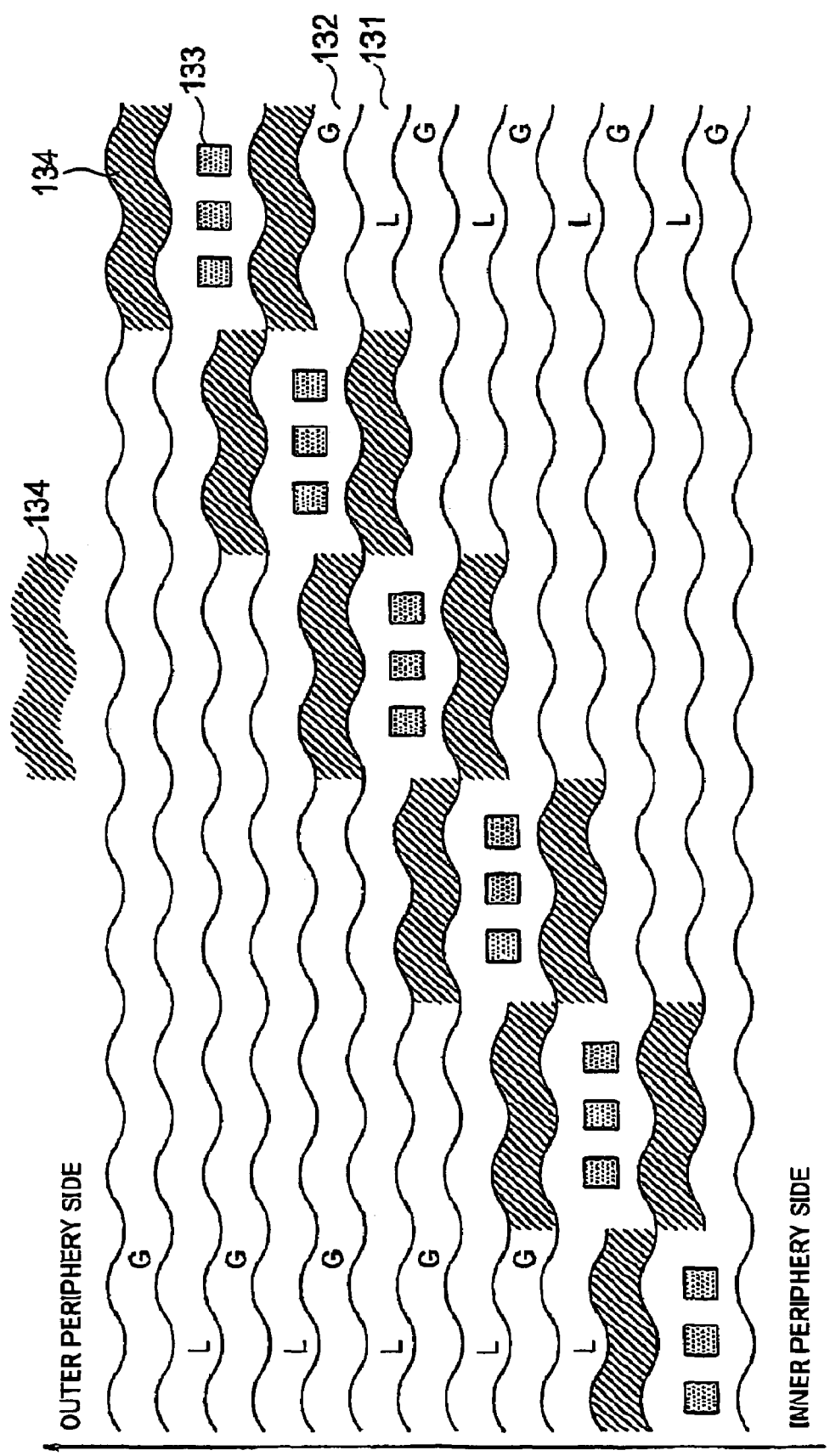

As FIG. 3 shows, a mutual crosstalk develops at the data-recording area of any land area (area L) or any groove area (area G) that is adjacent to a header area, when data is reproduced from the recording layer 10 by an ordinary recording/reproducing method. The crosstalk renders it difficult to detect data recorded in the header area or the data-recording area. If user data is recorded in the land area or groove area that is adjacent to a header area, the prepit signals reproduced from the header area prominently influence the signal that represents the user data reproduced from the land area or groove area. Consequently, the user data can hardly be reproduced. On the other hand, as to reproducing the prepit signals, the signal representing the user data influences the signal reproduced from the prepits, making it difficult to read the header data correctly.

Thus, both the header area and the data-recording area are influenced by crosstalk. It is therefore necessary not to record the user data in the data-recording area of any land area or any groove area that is adjacent to a header area. There is a demand for a method of recording/reproducing data on an optical disc in this way.

In FIG. 3, the shaded regions indicate dummy-data areas in which user data should not be recorded. The dummy-data areas 134 are located at the tails of the segments in the groove areas 132, as viewed in the direction of recording data. In the case of the land areas 181, the dummy-data areas 184 are located at the tails of the header areas of the segments. Thus, at the boundary between the zones, a dummy-data area 134 exists at a position other than immediately after or the tail of the header area. Therefore, the data-recording area of at least one land-groove pair is not used at the zone boundary.

Figure 4:
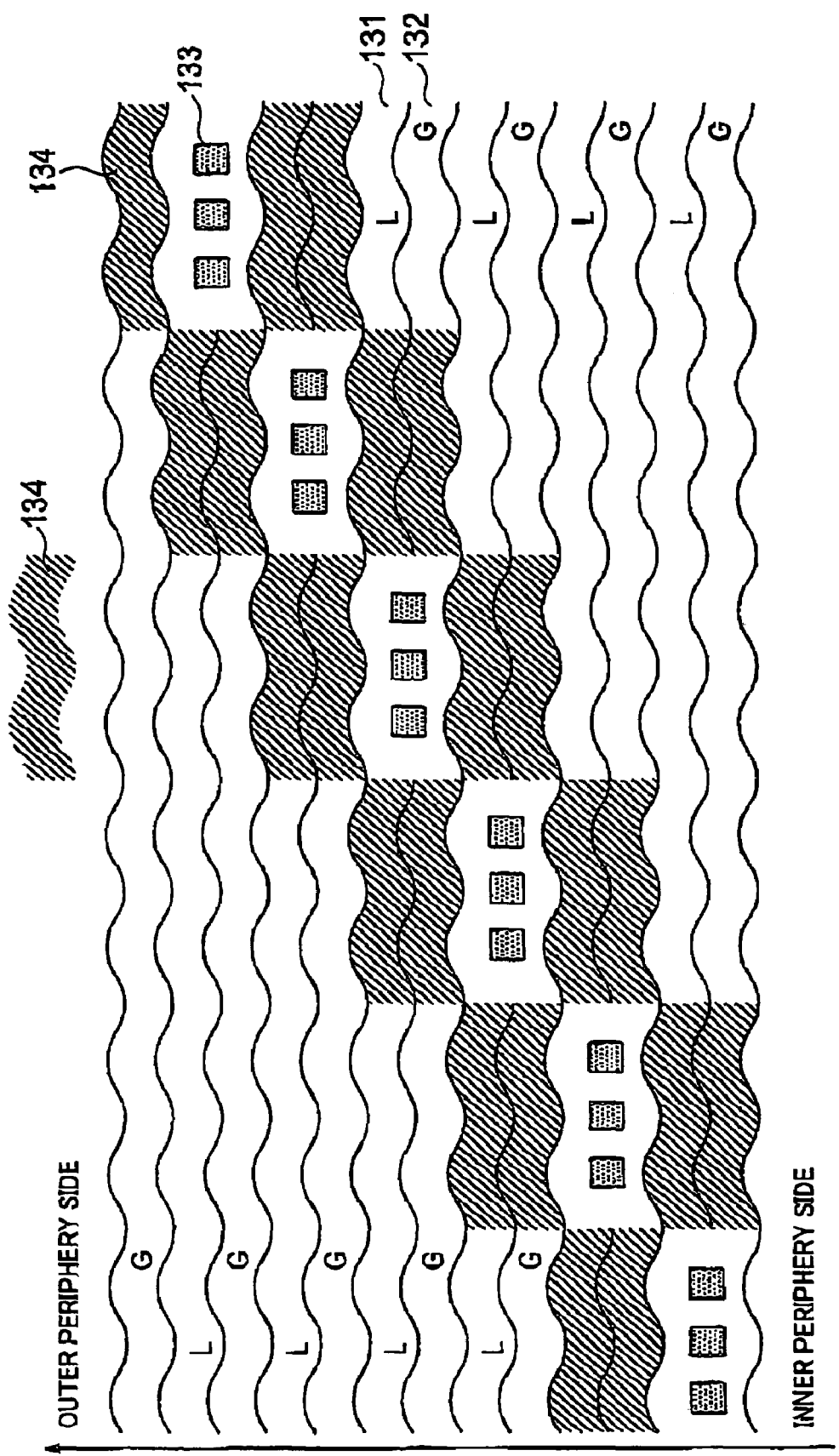
FIG. 4 is a top plan view illustrating another example of the arrangement of the dummy-data areas in an optical disc according to the present invention.
Figure 5:
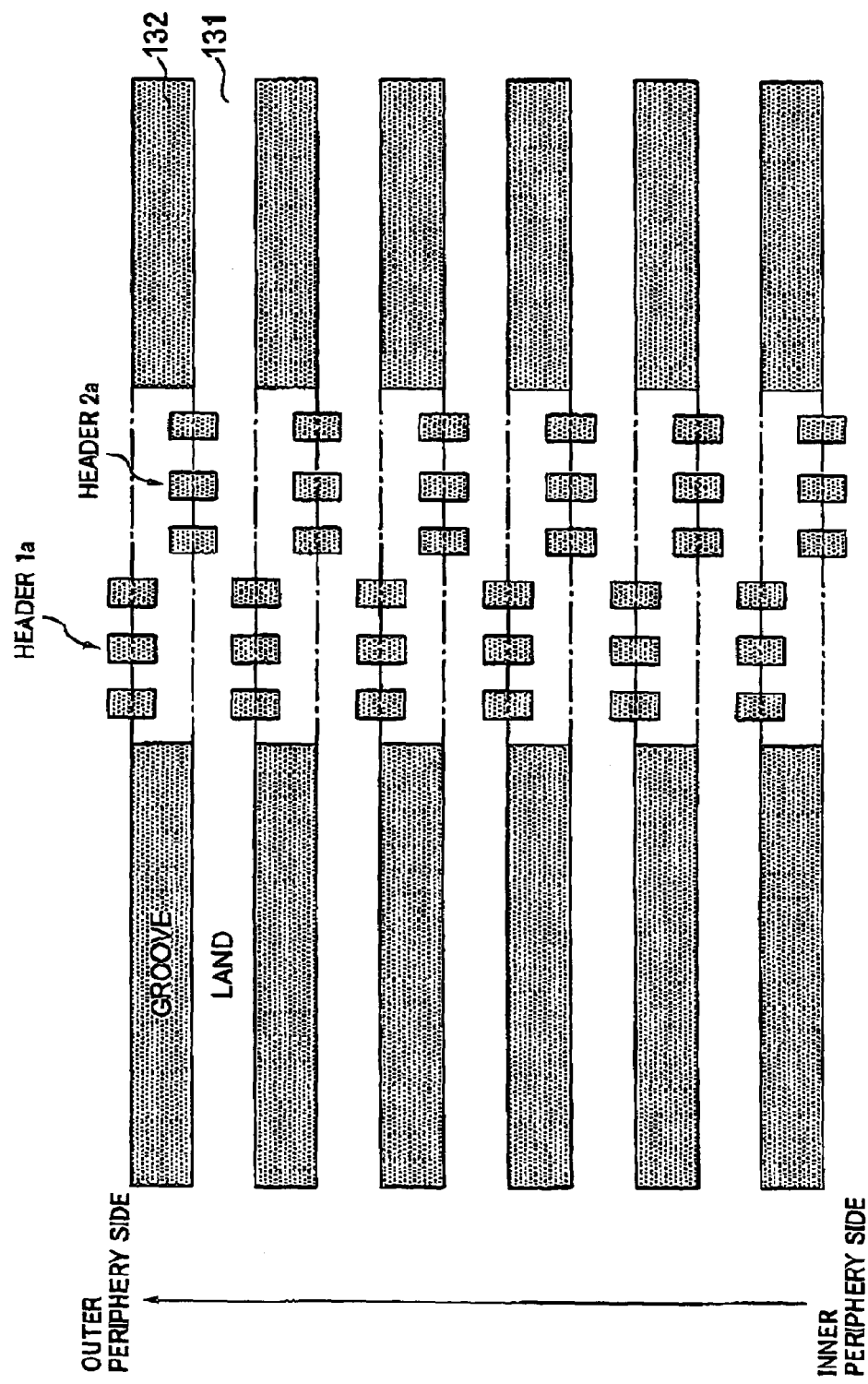
FIG. 5 is a top plan view of an example of the conventional optical disc.

As FIG. 4 shows, another dummy-data area 134 may be provided outside each dummy-data area 184 of FIG. 3. The expansion of a dummy-data area further decreases the crosstalk between the optical spots in the header area and the data-recording area, and helps to accomplish reliable detection of the address data and recorded data. To detect any header, a sum signal is detected as in the 4.7-GB DVD-RAM, thereby preserving the quality of the signals reproduced from a header area. In this case, the data-recording areas of at least two land-groove pairs are not used in any zone boundary (not shown). This also helps to preserve the quality of signals.

Figure 6:
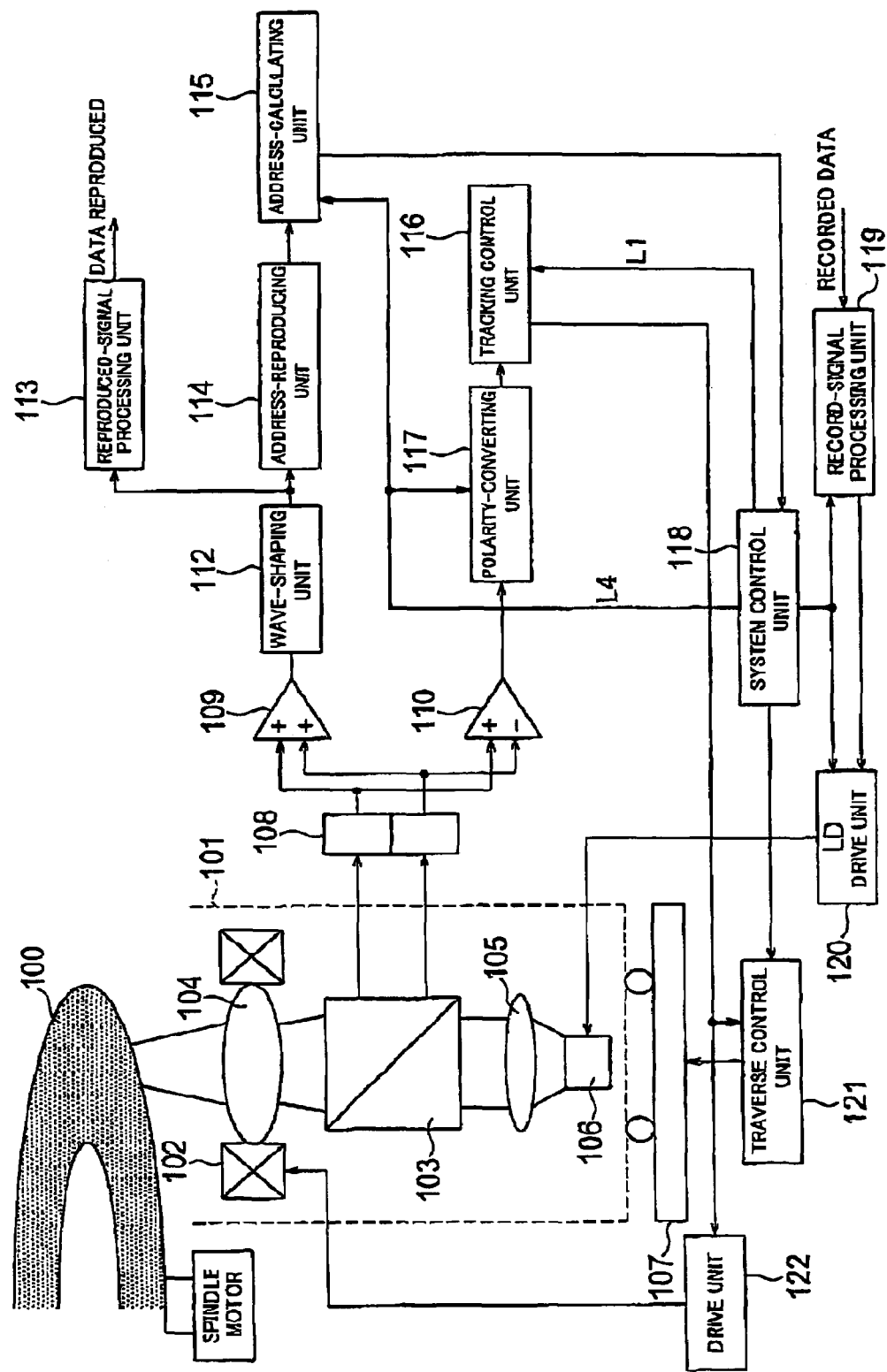
FIG. 6 is a block diagram of an optical disc drive that can record and reproduce data in and from an optical disc.
Figure 7:
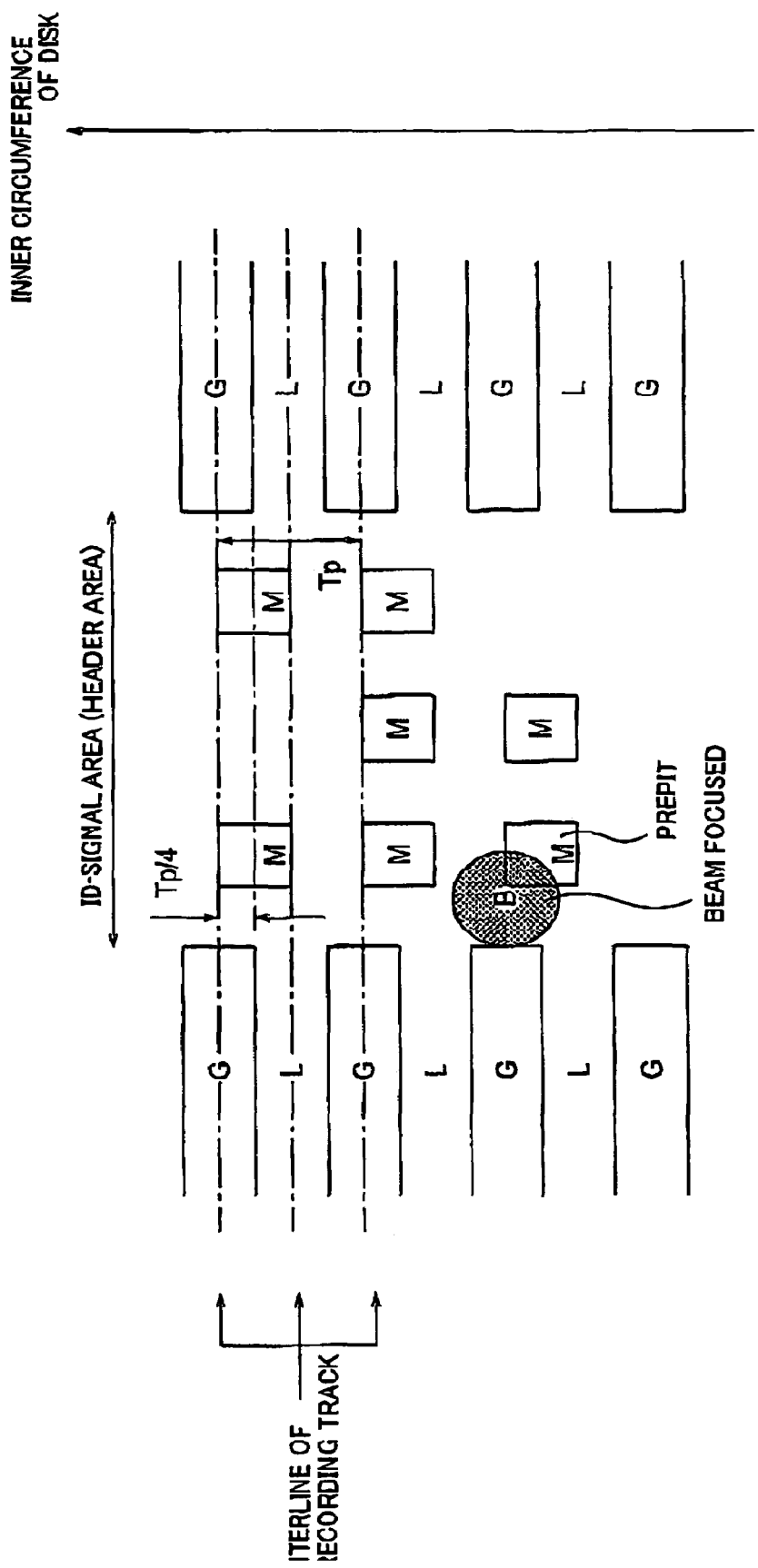
FIG. 7 is a top plan view of another example of the conventional optical discs.
Figure 8:
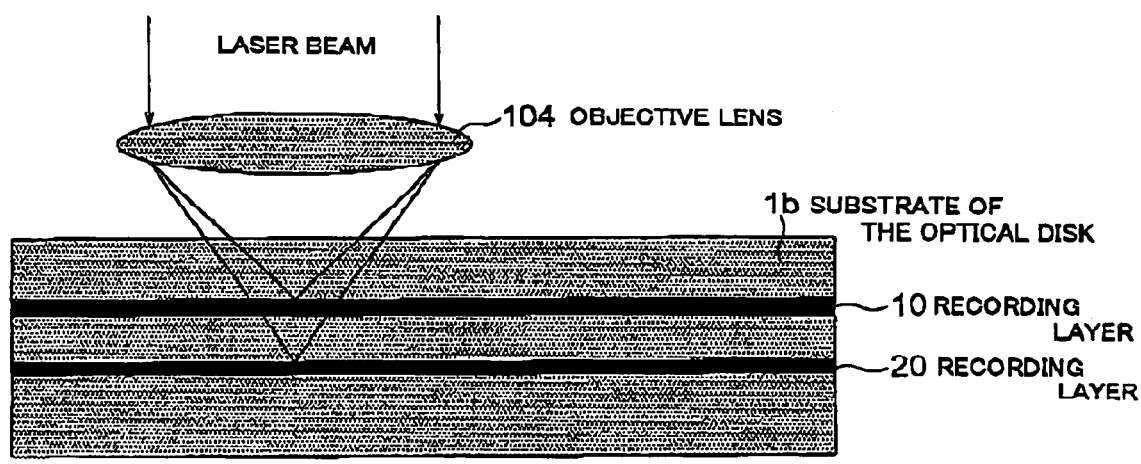
FIG. 8 is a top plan view illustrating an example of the arrangement of the dummy data areas in an optical disc according to the invention.
Figure 9A:
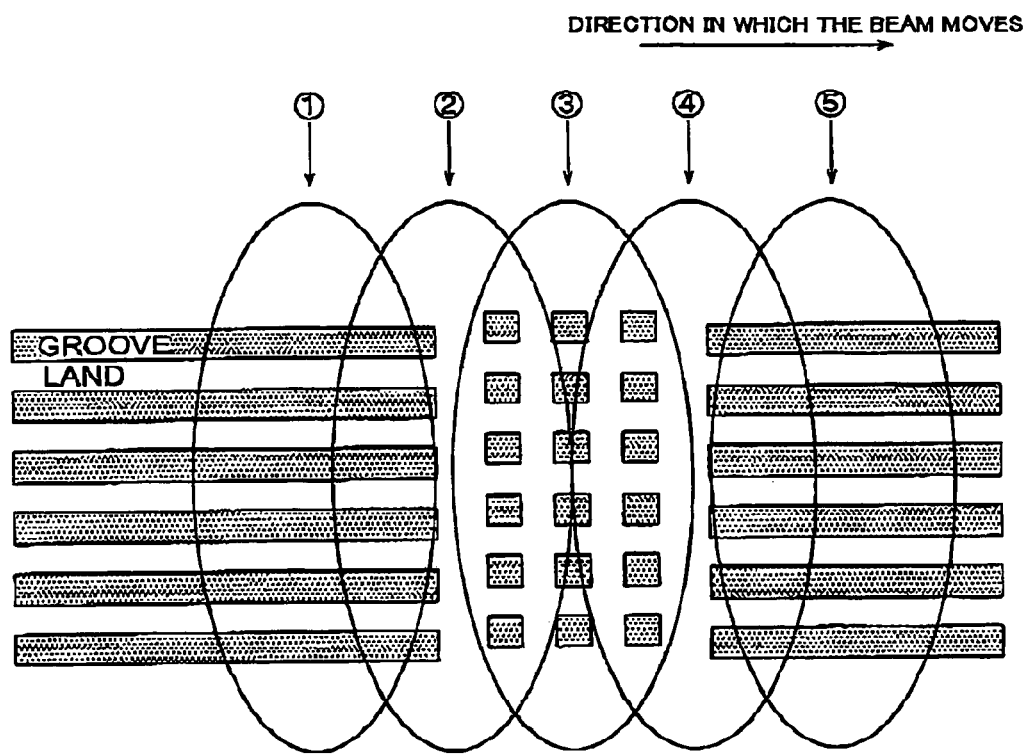
FIGS. 9A and 9B are a top plan view of positions that a light beam may take at the prepits, and a graph representing the relation between the position of the light beam and the intensity of reflected light.
Figure 9B:
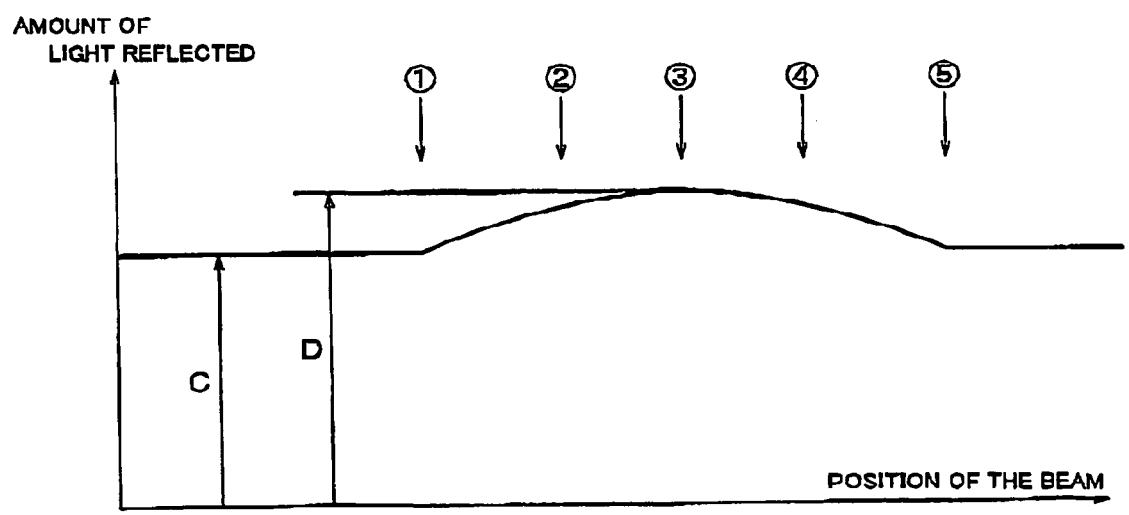

The block configuration of the apparatus that performs the method of recording/reproducing data on an optical disc, according to the present embodiment, is similar to the configuration of the optical disc drive shown in FIG. 6. Therefore, the apparatus will be described with reference to FIG. 6. Since the apparatus uses a two-layer optical disc in, this embodiment, the focus control the apparatus cares out differs from the conventional focus control of the optical discs including single-layer recording film. The focus control will not be described, however, since it is not a subject matter of the present invention.

In order not to record the user data in any dummy-data area, the system control unit 118 controls the generation and outputting of data to be recorded so that no data may be recorded in each land area for a time equivalent to the length of the header area. The length of the header area can be controlled at high precision by counting clock pulses or bytes, because it is recorded in synchrony with a clock signal.

In any groove area, data is recorded in the recording-data area immediately after data has been recorded in the header area. The system control unit 118 controls the generation and outputting of data to be recorded so that data may be recorded in the segment, leaving that part of the segment to be unrecorded corresponding to the next header area in the length equal to that of the next header area preceding the end of the segment.

Preferably, no user data is recorded in any dummy-data area. Nevertheless, dummy data including relatively short marks, such as 2T marks and 3T marks, and associated spaces, may be repeatedly recorded in the dummy-data areas for the purpose of decreasing the change in transmittance or reflectance that the recording layer 20 undergoes when data is recorded or reproduced.

In other words, the dummy-data areas may remain unrecorded; however, the dummy-data areas may cause the recording layer 20 to have non-uniform reflectance or non-uniform transmittance within the beam spot that reaches the layer 20 after passing through the recording layer 10. This is why relatively short marks (e.g., 2T marks and 3T marks) and associated spaces should be repeatedly recorded in the dummy-data areas. In consideration of the interference between adjacent prepits, data useful in the optical disc drive, other than the user data, may be recorded in the dummy-data areas, the useful data including copy-protection data, drive-parameter data etc.

The dummy-data areas may be used as areas for holding data that adjusts the power of the data-recording beam. The conventional optical disc has a test area at its inner circumferential region. The test area is used to adjust the power of the data-recording beam applied to the disc. This is because the beam may not be intense enough to write data on the disc if the surface of the disc is stained. Unless the power of the data-recording beam is adjusted, no recorded marks will be formed in the disc, causing a data-recording failure. The data-recording failure can be avoided by increasing the power of the data-recording beam.

However, this conventional method of using only the inner circumferential region to adjust the power of the data-recording beam cannot prevent a data-recording failure if the intermediate circumferential region of the disc is stained. The intermediate circumferential region cannot be used to adjust the power of the data-recording beam in the case of CD-R or DVD-R, in which data can be recorded only once. In the case of a rewritable disc, such DVD-RAM or DVD-RW, a test area must be provided in the data-recording region itself. If a test area is provided in the data-recording region, the data-storage capacity of the disc will inevitably decrease by the data-holding capacity of the test area. This prevents the disc from having an increased total storage capacity.

The dummy-data areas of the optical disc according to the present invention are regions in which the user data is not recorded. Hence, the data-storage capacity of the disc will not decrease at all if the dummy-data areas are used as a test area. The dummy-data areas, each provided adjacent to a header area, can be used to adjust therein the power of the data-recording beam at any radial position of the disc.

The embodiments described above are no more than examples of preferred modes of the present invention Obviously, the present invention can be applied to optical discs, data-recording/reproducing methods using any one of these optical discs, and optical-data recording apparatuses, which can read on the claims described herein.

For example, a disc format similar to the one described above may be applied to multi-layer optical discs, each having three or more recording layers, although the embodiments described above are concerned with two-layer optical discs. In such an optical disc, a beam is focused on the deepest recording layer to record or reproduce data in the recording layer, and the two other recording layers are provided near the light-incident sides. Thus, the interlayer crosstalk can be significantly reduced to provide a large storage capacity to the disc if the three recording layers have the same disc format as the one described above and if the two layers provided near the light-incident side have prepit-header areas not overlapping as viewed from the light-incident side.

The disc format according to the present invention can be applied to multi-layer optical discs, each having two or more recording layers, for which the description is provided, and also to single-layer optical discs. If the disc format is applied to a single-layer optical disc, the influence of the so-called prepit ghost can be prevented, in addition to the configuration of prevention of a reproduction crosstalk, by allowing a smooth resin flow during process of forming the disc substrate by means of injection molding. Further, the header data can be reliably reproduced because the disc has dummy-data areas adjacent to the header areas, instead of the data areas, adjacent in the radial direction of the disc and the user data is not recorded in the dummy-data areas.

As may be clear from the foregoing, the present invention can provide a simple disc format means that can be applied to optical discs of the land/groove recording type, each having a plurality of recording layers. The invention can also provide a method of recording and reproducing data on discs having such a disc format. The present invention can therefore reduce the interlayer crosstalk between the layers of a multi-layer disc, and can increase the storage capacity of optical discs by applying a high-efficiency disc format to the optical discs.

The invention claimed is:

1. An optical disc comprising at least one recording layer including land areas and groove areas to be used as recording tracks, wherein:
   a data-recording area of at least one of said at least one recording layer is divided into a plurality of zones in a radial direction;
   each of said plurality of divided zones includes a plurality of header areas each including prepits that hold predetermined data, said header area being arranged at every other boundary among boundaries between said land areas and said groove areas so that at least one header area is provided in each recording track; and
   each header area is shifted in a circumferential direction from another header area that is spaced from said each header area by a distance corresponding to at least two of said boundaries, and is not aligned in the radial direction with said another header area.

2. The optical disc according to claim 1, wherein a signal change in an optical signal generated by receiving light reflected from a second recording layer that is arranged closer to a light-incident side than a first recording layer on which a light beam is focused is at most 10% of a signal amplitude of an optical signal generated by receiving light reflected from a recorded mark/space that includes prepit trains and is provided in said first recording layer.

3. The optical disc according to claim 1, wherein said groove areas wobble at a frequency equal to an integral multiple of a channel-clock frequency and are aligned in each zone in said radial direction.

4. The optical disc according to claim 3, wherein a circumferential length of said header areas and a circumferential length of a segment divided by said header areas to form a unit data-recording area are integral multiples of a wobbling period at which said groove areas wobble.

5. The optical disc according to claim 1, wherein said predetermined data held in said header areas include, in addition to a sync signal, at least one of subordinate data items including address data, recording-layer data, copy-protection data, and error-detection data and error-correction data for said predetermined data.

6. The optical disc according to claim 1, wherein said header areas and said data-recording areas adopt a common modulation scheme, and said prepits in each header area are recorded at a line density that is an integral divisor of a line density of recorded marks recorded in said recording tracks.

7. The optical disc according claim 1, wherein dummy-data areas in which user data is not recorded are provided in portions of said land areas and said groove areas constituting said data-recording areas, said portions being adjacent to said header areas in said radial direction.

8. The optical disc according to claim 1, wherein dummy-data areas in which user data is not recorded are provided in portions of one of said land areas and one said groove areas constituting said data-recording areas, which are adjacent to said header area in said radial direction, and in portions of another of said land areas and another of said groove areas, which are adjacent in said radial direction to said one of said groove areas and said one of said land areas, respectively constituting said data-recording areas.

9. The optical disc according to claim 7, wherein a shortest mark and a shortest space are repeatedly formed in said dummy-data areas.

10. The optical disc according to claim 7, wherein control data for controlling an apparatus that records and reproduces data on said optical disc is recorded in said dummy-data areas.

11. The optical disc according to claim 7, wherein said dummy-data areas axe used as areas for adjusting a power of a data-recording beam.

12. A method of recording and reproducing data on said optical disc according to claim 1, wherein user data is not recorded in portions of one of said land areas and one of said groove areas constituting said data-recording areas, said portions being adjacent in said radial direction to said header areas.

13. The method of recording and reproducing data on said optical disc according to claim 1, wherein user data is not recorded in portions of one of said land areas and one of said groove areas constituting said data-recording areas, which are adjacent to said header area in said radial direction, and in portions of another of said land areas and another of said groove areas, which are adjacent in said radial direction to said one of said groove areas and said one of said land areas, respectively, constituting said data-recording areas.

* * * * *